(12) United States Patent
Jin et al.

(10) Patent No.: US 12,277,767 B2
(45) Date of Patent: Apr. 15, 2025

(54) MULTIMODAL UNSUPERVISED VIDEO TEMPORAL SEGMENTATION FOR SUMMARIZATION

(71) Applicant: ADOBE INC., San Jose, CA (US)

(72) Inventors: Hailin Jin, San Jose, CA (US); Jielin Qiu, Pittsburgh, PA (US); Zhaowen Wang, San Jose, CA (US); Trung Huu Bui, San Jose, CA (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 45 days.

(21) Appl. No.: 17/804,656

(22) Filed: May 31, 2022

(65) Prior Publication Data

US 2023/0386208 A1 Nov. 30, 2023

(51) Int. Cl.
*G06V 20/00* (2022.01)
*G06F 16/34* (2019.01)
*G06F 16/683* (2019.01)
*G06V 10/774* (2022.01)
*G06V 20/40* (2022.01)

(52) U.S. Cl.
CPC ............ *G06V 20/47* (2022.01); *G06F 16/345* (2019.01); *G06F 16/685* (2019.01); *G06V 10/774* (2022.01); *G06V 20/49* (2022.01)

(58) Field of Classification Search
None
See application file for complete search history.

(56) References Cited

U.S. PATENT DOCUMENTS

| | | | |
|---|---|---|---|
| 2003/0218696 A1* | 11/2003 | Bagga | H04N 5/144 |
| | | | 348/700 |
| 2006/0290699 A1* | 12/2006 | Dimtrva | H04N 21/4341 |
| | | | 345/473 |
| 2017/0132498 A1* | 5/2017 | Cohen | G06N 5/022 |
| 2020/0066278 A1* | 2/2020 | Steelberg | G06N 3/045 |
| 2021/0073526 A1* | 3/2021 | Zeng | G06V 20/41 |
| 2021/0110166 A1* | 4/2021 | Gunawardena | G06F 16/7844 |
| 2021/0248376 A1* | 8/2021 | Zhao | G06V 20/49 |
| 2022/0027633 A1* | 1/2022 | Jo | G06N 3/044 |
| 2022/0076023 A1* | 3/2022 | Shin | G06F 18/231 |
| 2022/0319493 A1* | 10/2022 | Ohishi | G06V 10/82 |
| 2022/0353100 A1* | 11/2022 | Huang | G06F 40/35 |

(Continued)

OTHER PUBLICATIONS

Video and Language Inference (Year: 2021).*

(Continued)

*Primary Examiner* — Daniel T Tekle
(74) *Attorney, Agent, or Firm* — F. CHAU & ASSOCIATES, LLC

(57) ABSTRACT

Systems and methods for video segmentation and summarization are described. Embodiments of the present disclosure receive a video and a transcript of the video; generate visual features representing frames of the video using an image encoder; generate language features representing the transcript using a text encoder, wherein the image encoder and the text encoder are trained based on a correlation between training visual features and training language features; and segment the video into a plurality of video segments based on the visual features and the language features.

18 Claims, 9 Drawing Sheets

(56) References Cited

U.S. PATENT DOCUMENTS

2023/0052582 A1* 2/2023 Ma .......................... G06F 18/22
2023/0115551 A1* 4/2023 Jin ........................ G06V 20/41
382/157

OTHER PUBLICATIONS

Published in: 2021 IEEE/CVF International Conference on Computer Vision (ICCV) (2021, pp. 1847-1857) Authors: Juncheng Li • Siliang Tang • Linchao Zhu • Haochen Shi • Xuanwen Huang • Fei Wu • Yi Yang • Yueting Zhuang (Year: 2021).*

Zhou, et al., Video Summarisation by Classification with Deep Reinforcement Learning. In BMVC, arXiv preprint: arXiv:1807.03089v3 [cs.CV] Sep. 3, 2018, pp. 1-13.

Otani, et al., "Video Summarization using Deep Semantic Features", arXiv preprint: arXiv:1609.08758v1 [cs.CV] Sep. 28, 2016, 16 pages.

Cohen-Addad, et al., "Hierarchical Clustering: Objective Functions and Algorithms", In SODA, arXiv preprint: arXiv:1704.02147v1 [cs.DS] Apr. 7, 2017, 43 pages.

Johnson, et al., "Bayesian Nonparametric Hidden Semi-Markov Models", J. Mach. Learn. Res,m 14:673-701, arxiv preprint: arxiv:1203.1365v2 [stat.ME] Sep. 7, 2012.

Andrew, et al., "Deep Canonical Correlation Analysis", In Proceedings of the 30th International Conference on Machine Learning, 2013, 9 pages.

\* cited by examiner

Hierarchical Dirichlet Process Hidden semi-Markov Model

MULTIMODAL UNSUPERVISED VIDEO TEMPORAL SEGMENTATION FOR SUMMARIZATION

BACKGROUND

The following relates video segmentation and summarization. Video segmentation is a type of video processing that splits an original video in to segments based on one or more criteria. For example, videos can be segmented by topics within the video. Longer videos may be segmented so their content is more easily understood by a user. Segmenting videos can also be useful for generating a video summary. Livestream tutorial videos in particular are often hours long, and are frequently used for online learning. Experts in design, digital marketing, creative painting, and other skills are able to teach using livestream sessions. These livestream videos are often recorded and uploaded to the Internet directly after the live sessions in an unedited or lightly edited form, which can make it difficult for users to quickly view the content. Thus, video summaries for livestream tutorials can help users absorb the material.

Conventional video summarization systems segment videos based on visual data such as changing scenes. However, in videos such as livestream videos, the visual changes can unclear. To overcome these issues, the longer videos may be segmented manually by a human. However, this is a time consuming process. Therefore, there is a need in the art for a systems and methods for segmenting and summarizing videos.

SUMMARY

The present disclosure describes systems and methods for video segmentation and summarization. Embodiments of the present disclosure include a video summarization apparatus configured to segment a video based on a combination of visual features and language features. Some embodiments further include a summarization component configured to generate text and/or image based summaries of the video. Some embodiments of the video summarization apparatus include a text encoder including a transformer network for encoding text features from a transcript of the video, as well as an image encoder including a convolutional neural network (CNN) for encoding visual features from the video. Then, some embodiments use a correlation between the text features and visual features to determine points in the video corresponding to a changing topic, in order to segment the video.

A method, apparatus, non-transitory computer readable medium, and system for multimodal unsupervised video temporal segmentation are described. One or more aspects of the method, apparatus, non-transitory computer readable medium, and system include receiving a video and a transcript of the video; generating visual features representing frames of the video using an image encoder; generating language features representing the transcript using a text encoder, wherein the image encoder and the text encoder are trained based on a correlation between training visual features and training language features; and segmenting the video into a plurality of video segments based on the visual features and the language features.

A method, apparatus, non-transitory computer readable medium, and system for multimodal unsupervised video temporal segmentation are described. One or more aspects of the method, apparatus, non-transitory computer readable medium, and system include receiving a training set comprising a training video and a training transcript of the video; generating visual features representing frames of the training video using an image encoder; generating language features representing the training transcript using a text encoder; computing a correlation between the visual features and the language features; updating parameters of the image encoder and the text encoder based on the correlation; and segmenting a video using the image encoder and the text encoder.

An apparatus, system, and method for multimodal unsupervised video temporal segmentation are described. One or more aspects of the apparatus, system, and method include an image encoder configured to generate visual features representing frames of a video; a text encoder configured to generate language features representing a transcript of the video, wherein the image encoder and the text encoder are trained based on a correlation between training visual features and training language features; and a segmentation component configured to segment the video into a plurality of video segments based on the visual features and the language features.

DETAILED DESCRIPTION

The present disclosure describes systems and methods for video segmentation and summarization. Video segmentation involves determining where a video should be split in time to generate segments according to some basis, such as video topics. Video summarization involves providing a synopsis of the content contained within the video, and can include determining salient information from portions of the video. Video summarization can take both unimodal and multimodal approaches. Unimodal approaches use, for example, either the visual content of the video or audio/text information such as a transcript. Multimodal methods use both the available textual metadata and the visual data. Some multimodal systems learn semantic or category-driven summarization in an unsupervised way.

Video summarization can begin with temporally segmenting a video. However, many videos do not come pre-labeled by topic, and it can be time-consuming to manually label a large number of long videos. Accordingly, embodiments of the disclosure use machine learning methods to temporally segment videos.

Most conventional video segmentation techniques are optimized for short videos, and generate visual features based on individual image frames. However, such systems can depend on clear scene changes to detect visual transitions. Other segmentation systems manually label a training set of videos with supervised methods to solve a classification problem by detecting more subtle boundaries. However, some videos such as livestream videos are both long and include off-topic chatter that makes it difficult to identify segment boundaries.

The present disclosure describes systems and methods for multimodal temporal segmentation that use a combination of the visual and language information. Embodiments of the disclosure can be used for livestream video summarization. Some embodiments of the present disclosure temporally segment videos using the multimodal information, and then generate the summaries for each segment. The quality of segmentation results can have a significant impact on the summarization performance. Accordingly, embodiments utilize multimodal learning to capture relationships between the visual information and the language information for more accurate segmentation.

Embodiments include an unsupervised temporal segmentation method using multimodal visual and language information. For example, some embodiments extract important features from both modalities and learn the relationship and dependencies across domains to generate better segmentation results. For summarization, an unsupervised livestream video summarization pipeline outputs visual and language summarization based on the segmentation. The output summaries can provide salient information for users to understand the video in an efficient way.

Figure 1:
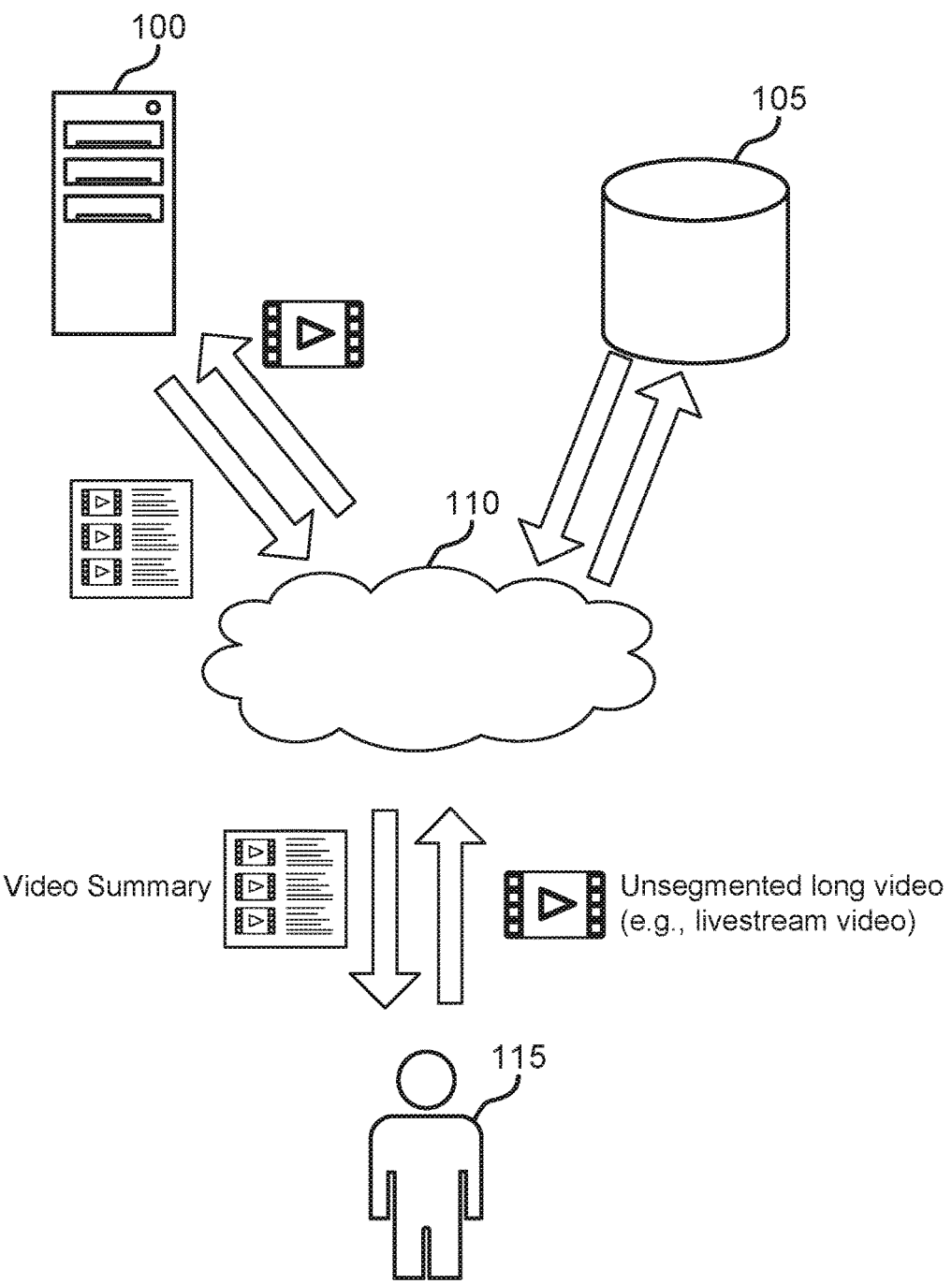
FIG. 1 shows an example of a video summarization system according to aspects of the present disclosure.
Figure 2:
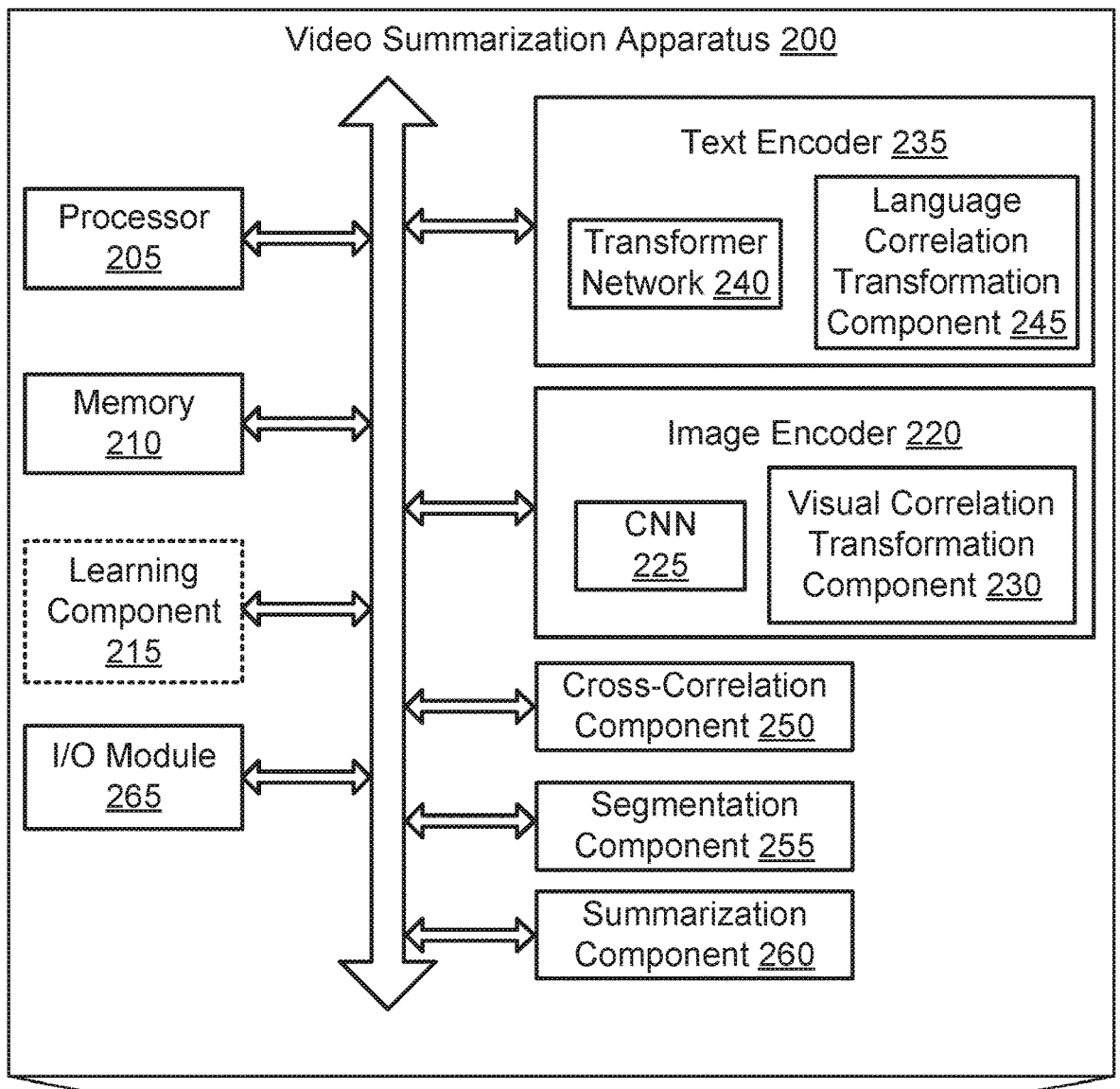
FIG. 2 shows an example of a video summarization apparatus according to aspects of the present disclosure.
Figure 3:
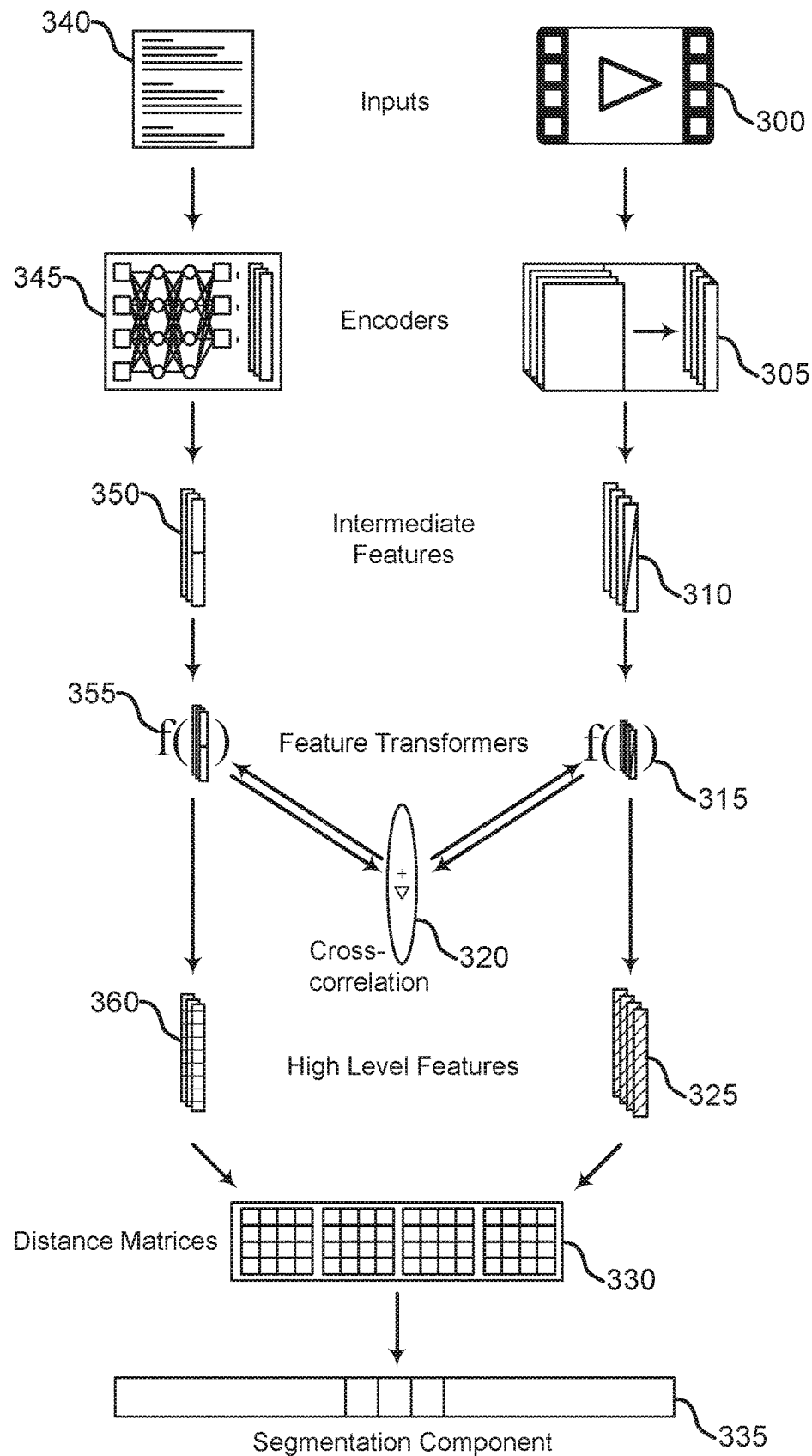
FIG. 3 shows an example of an unsupervised multimodal temporal segmentation framework according to aspects of the present disclosure.

Details regarding the architecture of an example video summarization system and apparatus are provided with reference to FIGS. 1-3. Example processes for video summarization are provided with reference to FIGS. 4-8. An example training process is provided with reference to FIG. 9.

Video Summarization System

A system and apparatus for multimodal unsupervised video temporal segmentation is described. One or more aspects of the apparatus include an image encoder configured to generate visual features representing frames of a video; a text encoder configured to generate language features representing a transcript of the video, wherein the image encoder and the text encoder are trained based on a correlation between training visual features and training language features; and a segmentation component configured to segment the video into a plurality of video segments based on the visual features and the language features.

Some examples of the apparatus, system, and method further include a text summarization component configured to generate a summary for the video based on the language features. In some aspects, the image encoder comprises a convolutional neural network and a visual correlation transformation component. According to some aspects, the text encoder comprises a transformer network and a language correlation transformation component.

FIG. 1 shows an example of a video summarization system according to aspects of the present disclosure. The example shown includes video summarization apparatus 100, database 105, network 110, and user 115.

In some embodiments, user 115 provides a video input to video summarization apparatus 100 through the network 110. User 115 may alternatively provide the video input to database 105 for later processing by videos summarization apparatus 100. Video summarization apparatus 100 receives the video from user 115 or database 105, segments the video based on visual data and transcript data from the video, generates a video summary based on the segmentation, and provides the video summary to user 115.

Network 110 may be represented by a cloud. A cloud is a computer network configured to provide on-demand availability of computer system resources, such as data storage and computing power. In some examples, the cloud provides resources without active management by user 115. The term cloud is sometimes used to describe data centers available to many users 115 over the Internet. Some large cloud networks 110 have functions distributed over multiple locations from central servers. A server is designated an edge server if it has a direct or close connection to a user 115. In some cases, a cloud is limited to a single organization. In other examples, the cloud is available to many organizations. In one example, a cloud includes a multi-layer communications network 110 comprising multiple edge routers and core routers. In another example, a cloud is based on a local collection of switches in a single physical location.

Database 105 is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

According to some aspects, video summarization apparatus 100 receives a video and a transcript of the video. Video summarization apparatus 100 is an example of, or includes aspects of, the corresponding element described with reference to FIG. 2. As will be described later, embodiments of video summarization apparatus 100 use several neural network components in order to temporally segment the video using information from multiple modalities, and generate a summary based on the segmentation.

FIG. 2 shows an example of a video summarization apparatus 200 according to aspects of the present disclosure. The example shown includes video summarization apparatus 200, processor 205, memory 210, learning component 215, image encoder 220, text encoder 235, cross-correlation component 250, segmentation component 255, summarization component 260, and I/O module 265. Video summarization apparatus 200 is an example of, or includes aspects of, the corresponding element described with reference to FIG. 1.

Processor 205 is an intelligent hardware device, and can be implemented as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, the processor is configured to operate a memory array (e.g., memory 210) using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Memory 210 is configured to store data used by video summarization apparatus 200, such as visual data, audio data, transcript data, encodings, trained machine learning models, algorithms (e.g., algorithms to calculate distance matrices based on encodings), and the like. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause processor 205 to perform various functions described herein. In some cases, memory 210 contains, among other things, a basic input/output system (BIOS) which controls basic hardware or software operation such as the interaction with peripheral components or devices. In some cases, a memory controller operates cells include in memory 210. For example, the memory controller can include a row decoder, column decoder, or both. In some cases, memory cells within memory 210 store information in the form of a logical state.

I/O module 265 enables a user or networked device to communicate with video summarization apparatus 200. Embodiments of I/O module 265 include an IO controller and/or a user interface. An IO controller may manage input and output signals for a device. IO controller may also manage peripherals not integrated into a device. In some cases, an IO controller may represent a physical connection or port to an external peripheral. In some cases, an IO controller may utilize an operating system such as iOS®, ANDROID®, MS-DOS®, MS-WINDOWS®, OS/2®, UNIX®, LINUX®, or another known operating system. In other cases, an IO controller may represent or interact with a modem, a keyboard, a mouse, a touchscreen, or a similar device. In some cases, an IO controller may be implemented as part of processor 205. In some cases, a user may interact with a device via IO controller or via hardware components controlled by an IO controller.

A user interface may enable a user (e.g., user 115 with reference to FIG. 1) to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

According to some embodiments of the present disclosure, video summarization apparatus 200 includes one or more a computer implemented artificial neural network(s) (ANN) to implement text encoder 235, image encoder 220, learning component 215, visual and language feature transformers (to be described later), cross-correlation component 250, segmentation component 255, or summarization component 260. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, learning component 215 computes a canonical correlation between the visual features and the language features, where the video is segmented based on the canonical correlation. In some examples, learning component 215 updates parameters of the image encoder 220 and the text encoder 235 based on the correlation. Learning component 215 is an example of, or includes aspects of, the corresponding element described with reference to FIG. 6.

According to some aspects, learning component 215 receives a training set including a training video and a training transcript of the video. Visual features and language features are generated and encoded by text encoder 235 and image encoder 220. Then, learning component 215 optimizes parameters of visual and language feature transformers (which constitute a nonlinear transformation model) according to a back-propagated negative loss corresponding to the correlation between visual features from the training video and language features from the training transcript. This will be described in more detail with reference to FIG. 3. In some embodiments, learning component 215 from a different apparatus other than video summarization apparatus 200 can be used to train the visual and language feature transformers and/or cross-correlation component 250. In some embodiments, cross-correlation component 250 is a part of learning component 215.

In one aspect, image encoder 220 includes CNN 225 and visual correlation transformation component 230. CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, image encoder 220 generates visual features representing frames of the video using an image encoder 220. In some examples, image encoder 220 performs a convolution process on frames of the video to obtain intermediate visual features. In some examples, image encoder 220 transforms the intermediate visual features using a visual correlation transformation to obtain the visual features.

According to some aspects, image encoder 220 is configured to generate visual features representing frames of a video. In some aspects, the image encoder 220 includes a convolutional neural network and a visual correlation transformation component 230. Image encoder 220 is an example of, or includes aspects of, the corresponding element described with reference to FIGS. 3 and 6.

In one aspect, text encoder 235 includes transformer network 240 and language correlation transformation component 245. According to some aspects, text encoder 235 generates language features representing the transcript using transformer network 240, where the image encoder 220 and the text encoder 235 are trained based on a correlation between training visual features and training language features.

In some examples, text encoder 235 encodes the transcript using a language model to obtain intermediate language features. In some embodiments, the language model is represented in transformer network 240. In some examples, text encoder 235 transforms the intermediate language features using a language correlation transformation to obtain the language features. In some examples, text encoder 235 divides the transcript into a set of sentences, where the language model is individually applied to each of the set of sentences. Text encoder 235 is an example of, or includes aspects of, the corresponding element described with reference to FIGS. 3 and 6.

Cross-correlation component 250 is an example of, or includes aspects of, the corresponding element described with reference to FIGS. 3 and 6. In some embodiments, cross-correlation component 250 is a part of learning component 215, and accordingly, can be provided in a different apparatus other than video summarization apparatus 200.

According to some aspects, segmentation component 255 segments the video into a set of video segments based on the visual features and the language features. According to some aspects, segmentation component 255 segments a video using the image encoder 220 and the text encoder 235 to generate the visual features and the language features. In some examples, segmentation component 255 computes one or more distances between the visual features and the language features, where the video is segmented based on the one or more distances. In some aspects, the one or more distances includes a Wasserstein Distance and a Gromov Wasserstein Distance. In some examples, segmentation component 255 clusters the visual features to obtain a set of visual feature clusters, where the video is segmented based on the set of visual feature clusters. In some aspects, the clustering is based on a Hierarchical Dirichlet Process Hidden semi-Markov Model (HDP-HSMM). Segmentation component 255 is an example of, or includes aspects of, the corresponding element described with reference to FIGS. 3 and 6.

According to some aspects, summarization component 260 selects a representative video frame for each of the set of visual feature clusters. This allows video summarization apparatus 200 to produce a video summary including the visual modality.

According to some aspects, summarization component 260 is configured to generate a summary for the video based on the language features. In some examples, summarization component 260 clusters sentences of the transcript based on the language features to obtain a set of sentence clusters. In some examples, summarization component 260 selects a summary sentence from each of the set of sentence clusters to obtain a set of summary sentences. In some examples, summarization component 260 generates a summary for the video based on the set of summary sentences. In some examples, summarization component 260 aligns the set of summary sentences with the set of video segments, where the summary is based on the alignment. Summarization component 260 is an example of, or includes aspects of, the corresponding element described with reference to FIG. 6.

FIG. 3 shows an example of an unsupervised multimodal temporal segmentation framework according to aspects of the present disclosure. The example shown includes visual input 300, image encoder 305, intermediate visual features 310, visual feature transformer 315, cross-correlation component 320, visual features 325, distance matrices component 330, segmentation component 335, language input 340, text encoder 345, intermediate language features 350, language feature transformer 355, and language features 360.

Image encoder 305 is an example of, or includes aspects of, the corresponding element described with reference to FIGS. 2 and 6. Text encoder 345 is an example of, or includes aspects of, the corresponding element described with reference to FIGS. 2 and 6.

Cross-correlation component 320 is an example of, or includes aspects of, the corresponding element described with reference to FIGS. 2 and 6. As described before, in some embodiments, cross-correlation component constitutes or is a part of learning component described with reference to FIG. 2.

Distance matrices component 330 is an example of, or includes aspects of, the corresponding element described with reference to FIG. 6. In some embodiments, distance matrices component 330 implements the determination of Wasserstein and Gromov Wasserstein Distance between features, as will be described below.

Segmentation component 335 is an example of, or includes aspects of, the corresponding element described with reference to FIGS. 2 and 6. Some embodiments of segmentation component 335 utilize Bayesian Nonparametric models to segment the videos temporally.

As described above, video summarization typically begins by temporally segmenting videos into segments that can be summarized. As most videos do not come pre-labeled by topic, and it can be time-consuming to manually label a large number of long videos, embodiments utilize unsupervised methods to temporally segment the videos.

Embodiments of the unsupervised temporal segmentation method take input from multiple modalities, including both visual features and language features. For the visual features, some embodiments sample video frames from the raw videos, where the sampling rate f depends on the fps of the raw video, and use a pre-trained neural network image encoder to extract visual features (fingerprints), where the visual fingerprints represent the video content. For the language features, embodiments translate the audio signal into transcripts using various methods known in the art. Since the transcript is not temporally perfectly aligned with video frames, some embodiments first assign the transcript sentences for the corresponding video frame, and if there is overlapping between several sentences or several frames, embodiments duplicate those in the corresponding manner, and formulate frame transcript pairs for each sampled frame in the timeline. Embodiments then extract sentence embeddings using a text encoder to get sentence-level representations.

In many cases, the transcript from the video includes ambiguity. Accordingly, embodiments remove redundant and noisy words before generating language embeddings. The first extracted raw visual features and language features (e.g., intermediate visual features 310 and intermediate language features 350) are defined as $V_1$ and $L_1$, respectively. Embodiments are designed around the assumption that there is some relationship and dependency within and between the visual and language features. Networks within the embodiments transform raw (intermediate) visual features $V_1$ to high-level visual features $V_2$ with the transformation $f(V_1)$, and transform raw (intermediate) language features $L_1$ to high-level visual features $L_2$ with the transformation $g(L_1)$. In some cases, the language and visual transformations are performed by language correlation transformation component 245 and visual correlation transformation component 230, respectively. Embodiments then compute the Wasserstein Distance on the high-level temporal visual features $V_2$ and language features $L_2$. Embodiments may also calculate the Gromov Wasserstein Distance (GWD) and Canonical Correlation (CCA) on these two different modalities during the same timestamp. These distances can be applied to Bayesian Nonparametric models to generate clusters of visual features and segment the livestream videos temporally. GWD and CCA will be described further later.

Relationships among visual features, among language features, and between visual features and language features can be measured by computing various distances. For same-modality distances, Wasserstein Distance may be used. Wasserstein Distance (WD) is introduced in Optimal Transport (OT), which is a natural type of divergence for registration problems as it accounts for the underlying geometry of the space, and can be applied to multimodal data matching and alignment tasks. In Euclidean settings, OT introduces WD $\mathcal{W}(\mu, \nu)$, which measures the minimum effort required to "display" points across measures $\mu$ and $\nu$. Assume $\mu \in P(\mathbb{X})$ and $\nu \in P(\mathbb{Y})$ denote two discrete distributions, formulated as $\mu = \Sigma_{i=1}^n u_i \delta_{x_i}$ and $\nu = \Sigma_{i=1}^n v_i \delta_{y_i}$, with $\delta_x$ as the Dirac function centered on x. $\Pi(\mu, \nu)$ denotes all the joint distributions $\gamma(x, y)$, with marginals $\mu(x)$ and $\nu(y)$. The weight vectors $u = \{u_i\}_{i=1}^n \in \Delta_n$ and $v = \{v_i\}_{i=1}^m \in \Delta_m$ belong to the n- and m-dimensional simplex, respectively. The WD between the two discrete distributions $\mu$ and $\nu$ is defined as:

$$\mathcal{D}_W(\mu, \nu) = \inf_{\gamma \in \Pi(\mu,\nu)} \mathbb{E}_{(x,y) \sim \gamma}[c(x, y)] = \min_{T \in \Pi(\mu,\nu)} \sum_{i=1}^n \sum_{j=1}^m T_{i,j} \cdot c(x_i, y_j) \quad (1)$$

where $\Pi(\mu, \nu) = \{T \in \mathbb{R}_+^{n \times m} | T 1_m = u, T^T 1_n = v\}$, $1_n$ denotes an n-dimensional all-one vector, and $c(x_i, y_j)$ is the cost function evaluating the distance between $x_i$ and $y_j$.

Embodiments compute the Wasserstein Distance temporally on both visual features and language features, considering each feature vector representing each frame or each transcript embedding.

Classic Optimal Transport (OT) requires defining a cost function across domains, which can be difficult to implement when the domains are in different dimensions. For comparing relationships across different modalities, Gromov Wasserstein Distance (GMD) extends OT by comparing distances between samples, rather than directly comparing the samples themselves.

Assume there are metric measure spaces $(X, d_x, \mu)$ and $(\mathcal{Y}, d_y, \nu)$, where $d_x$ and $d_y$ are distances on $\mathcal{X}$ and $\mathcal{Y}$, respectively. Embodiments compute pairwise distance matrices $D^x$ and $D^y$ as well as the tensor $L \in \mathbb{R}^{n_x \times n_x \times n_y \times n_y}$, where $L_{ijkl} = L(D^x_{ik}, D^y_{jl})$ measures the distance between pairwise distances in the two domains. $L(d_x(x_1, x_2), d_y(y_1, y_2))$ now captures how transporting $x_1$ onto $y_1$ and $x_2$ onto $y_2$ would distort the original distances between $x_1$ and $x_2$ and between $y_1$ and $y_2$. The discrete Gromov-Wasserstein distance is then defined by:

$$GWD(p, q) = \min_{\Gamma \in \Pi(p,q)} \sum_{i,j,k,l} L_{ijkl} \Gamma_{ij} \Gamma_{kl} \quad (2)$$

For each tuple $(x_i, x_k, y_j, y_l)$, embodiments compute the cost of altering the pairwise distances between $x_i$ and $x_k$ when splitting their masses to $y_j$ and $y_l$ by weighting them by $T_{ij}$ and $T_{kl}$, respectively. Embodiments compute the GWD across domains with the corresponding same timestamp, which captures the relationship and dependences between the visual domain and the language domain.

In some embodiments, distance matrices component 330 produces distance matrices containing distance information. In some embodiments, distance matrices component 330 produces a WD matrix between visual features, a GWD matrix between visual features and language features, a CCA matrix between visual features and language features, and/or a WD matrix between language features.

The described methods and their associated components may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Video Summarization

In FIGS. 4-8, a method for multimodal unsupervised video temporal segmentation is described. One or more aspects of the method include receiving a video and a transcript of the video; generating visual features representing frames of the video using an image encoder; generating language features representing the transcript using a text encoder, wherein the image encoder and the text encoder are trained based on a correlation between training visual features and training language features; and segmenting the video into a plurality of video segments based on the visual features and the language features. Some examples of the method, apparatus, non-transitory computer readable medium, and system further include converting audio data associated with the video to obtain the transcript.

Some examples of the method, apparatus, non-transitory computer readable medium, and system further include performing a convolution process on frames of the video to obtain intermediate visual features. Some examples further include transforming the intermediate visual features using a visual correlation transformation to obtain the visual features.

Some examples of the method, apparatus, non-transitory computer readable medium, and system further include encoding the transcript using a language model to obtain intermediate language features. Some examples further include transforming the intermediate language features using a language correlation transformation to obtain the language features. Some examples of the method, apparatus, non-transitory computer readable medium, and system further include dividing the transcript into a plurality of sentences, wherein the language model is individually applied to each of the plurality of sentences.

Some examples of the method, apparatus, non-transitory computer readable medium, and system further include computing one or more distances between the visual features and the language features, wherein the video is segmented based on the one or more distances. In some aspects, the one or more distances comprises a Wasserstein Distance and a Gromov Wasserstein Distance. Some examples of the method, apparatus, non-transitory computer readable medium, and system further include computing a canonical correlation between the visual features and the language features, wherein the video is segmented based on the canonical correlation.

Some examples of the method, apparatus, non-transitory computer readable medium, and system further include clustering the visual features to obtain a plurality of visual feature clusters, wherein the video is segmented based on the plurality of visual feature clusters. In some aspects, the clustering is based on a Hierarchical Dirichlet Process Hidden semi-Markov Model (HDP-HSMM).

Some examples of the method, apparatus, non-transitory computer readable medium, and system further include selecting a representative video frame for each of the plurality of visual feature clusters. Some examples of the method, apparatus, non-transitory computer readable medium, and system further include clustering sentences of the transcript based on the language features to obtain a plurality of sentence clusters. Some examples further include selecting a summary sentence from each of the plurality of sentence clusters to obtain a plurality of summary sentences. Some examples further include generating a summary for the video based on the plurality of summary sentences. Some examples of the method, apparatus, non-transitory computer readable medium, and system further include aligning the plurality of summary sentences with the plurality of video segments, wherein the summary is based on the alignment.

Figure 4:
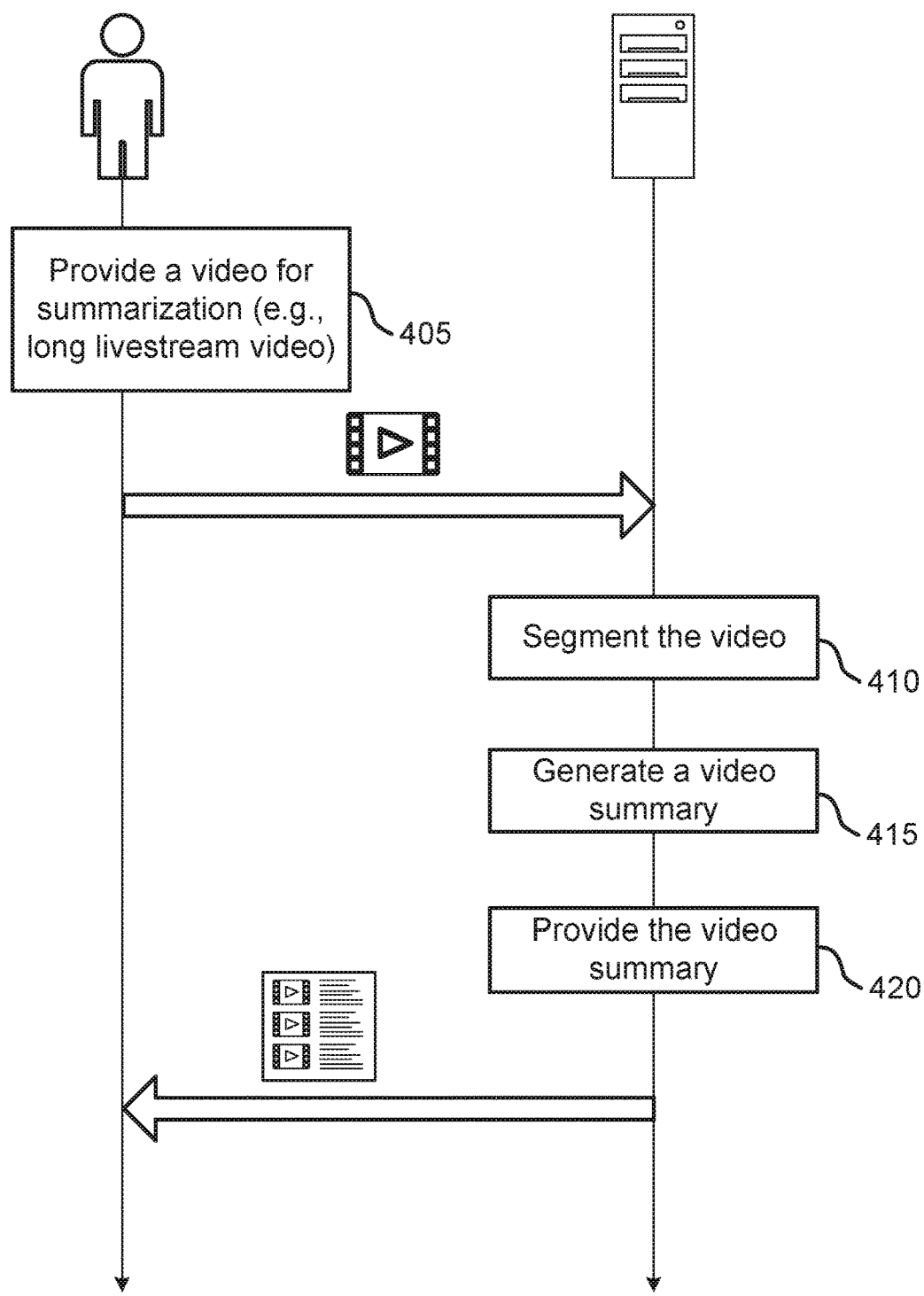
FIG. 4 shows an example of a method for video summarization according to aspects of the present disclosure.

FIG. 4 shows an example of a method 400 for video summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, a user provides a video for summarization (e.g., long livestream video). In some cases, the operations of this step refer to, or may be performed by, a user as described with reference to FIG. 1. In some cases, the video includes visual data and audio data, and the audio data is preprocessed to produce a transcript of the video.

At operation 410, the system segments the video. In some cases, the operations of this step refer to, or may be performed by, a segmentation component as described with reference to FIGS. 2, 3, and 6. In some embodiments, the segmenting is based on the unsupervised multimodal temporal segmentation framework described above with reference to FIG. 3.

At operation 415, the system generates a video summary. In some cases, the operations of this step refer to, or may be performed by, a summarization component as described with reference to FIGS. 2 and 6. At operation 420, the system provides the video summary. For example, the system can provide the video summary directly to the user through an application, or to a storage such as a database.

Figure 5:
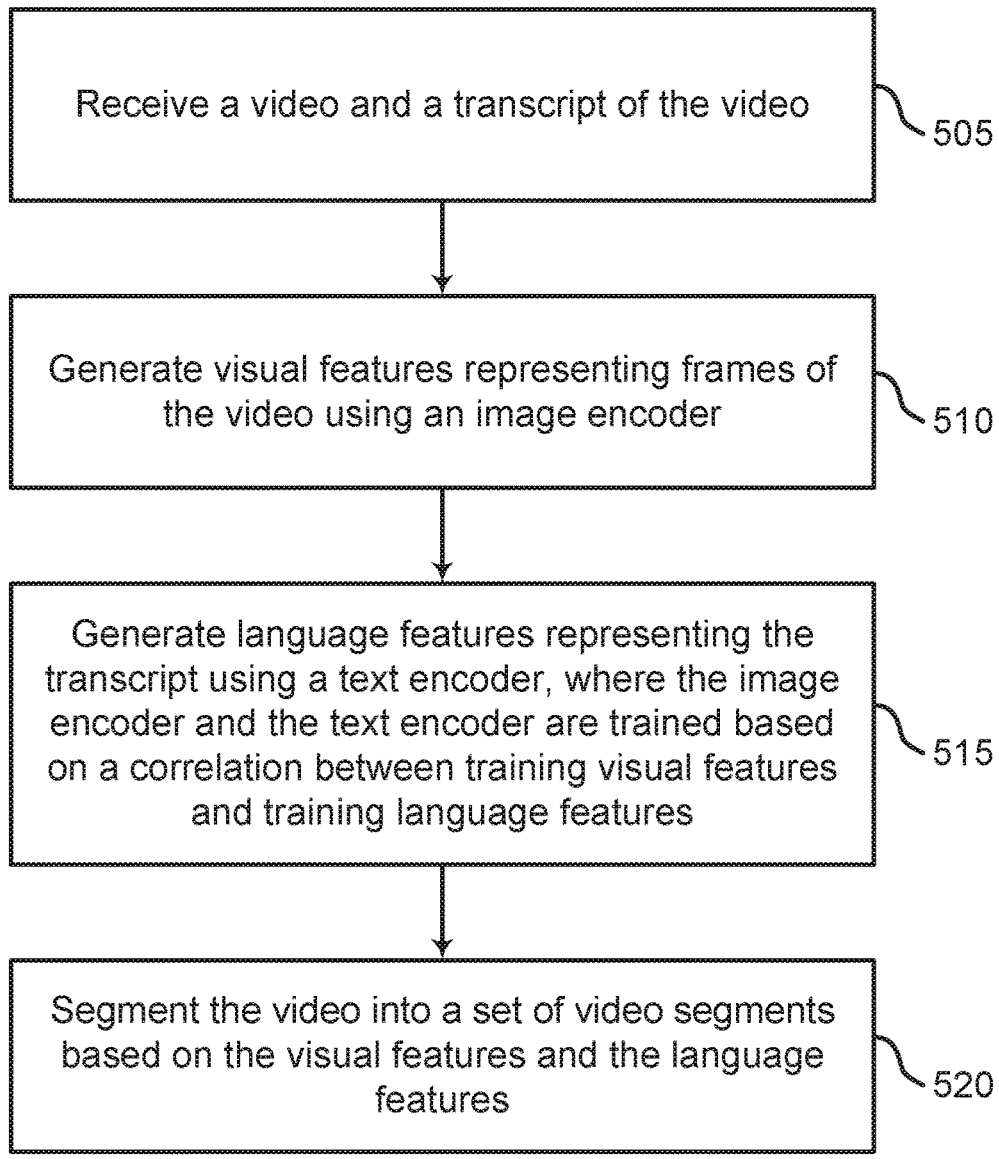
FIG. 5 shows an example of a method for video segmentation according to aspects of the present disclosure.

FIG. 5 shows an example of a method 500 for video segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives a video and a transcript of the video. In some cases, the operations of this step refer to, or may be performed by, a video summarization apparatus as described with reference to FIGS. 1 and 2.

At operation 510, the system generates visual features representing frames of the video using an image encoder. For example, some embodiments generate and encode the language features using a transformer network included in an image encoder as described with reference to FIG. 2. In some cases, the operations of this step refer to, or may be performed by, the image encoder as described with reference to FIGS. 2, 3, and 6.

At operation 515, the system generates language features representing the transcript using a text encoder, where the image encoder and the text encoder are trained based on a correlation between training visual features and training language features. In an example, as described with reference to FIG. 3, the language and video encoders generate intermediate features. The intermediate features are applied to a nonlinear transformation model and a cross-correlation component in order to generate high level language features and video features. In some cases, the operations of this step refer to, or may be performed by, a text encoder as described with reference to FIGS. 2, 3, and 6.

At operation 520, the system segments the video into a set of video segments based on the visual features and the language features. In some cases, the operations of this step refer to, or may be performed by, a segmentation component as described with reference to FIGS. 2, 3, and 6. For example, as described with reference to FIG. 3, the visual features and language features are applied to a distance matrices component to generate one or more distances between the features in the form of a distance matrix. The distance matrix is then applied to the segmentation component to temporally segment the video. For example, the segmentation component may apply Bayesian Nonparametric models that use the distances to generate clusters of visual features, and then segment the video based on the clusters.

According to some embodiments, the system may further provide the segmented video to a summarization component. More detail on video summarization is provided with reference to FIG. 7.

Figure 6:
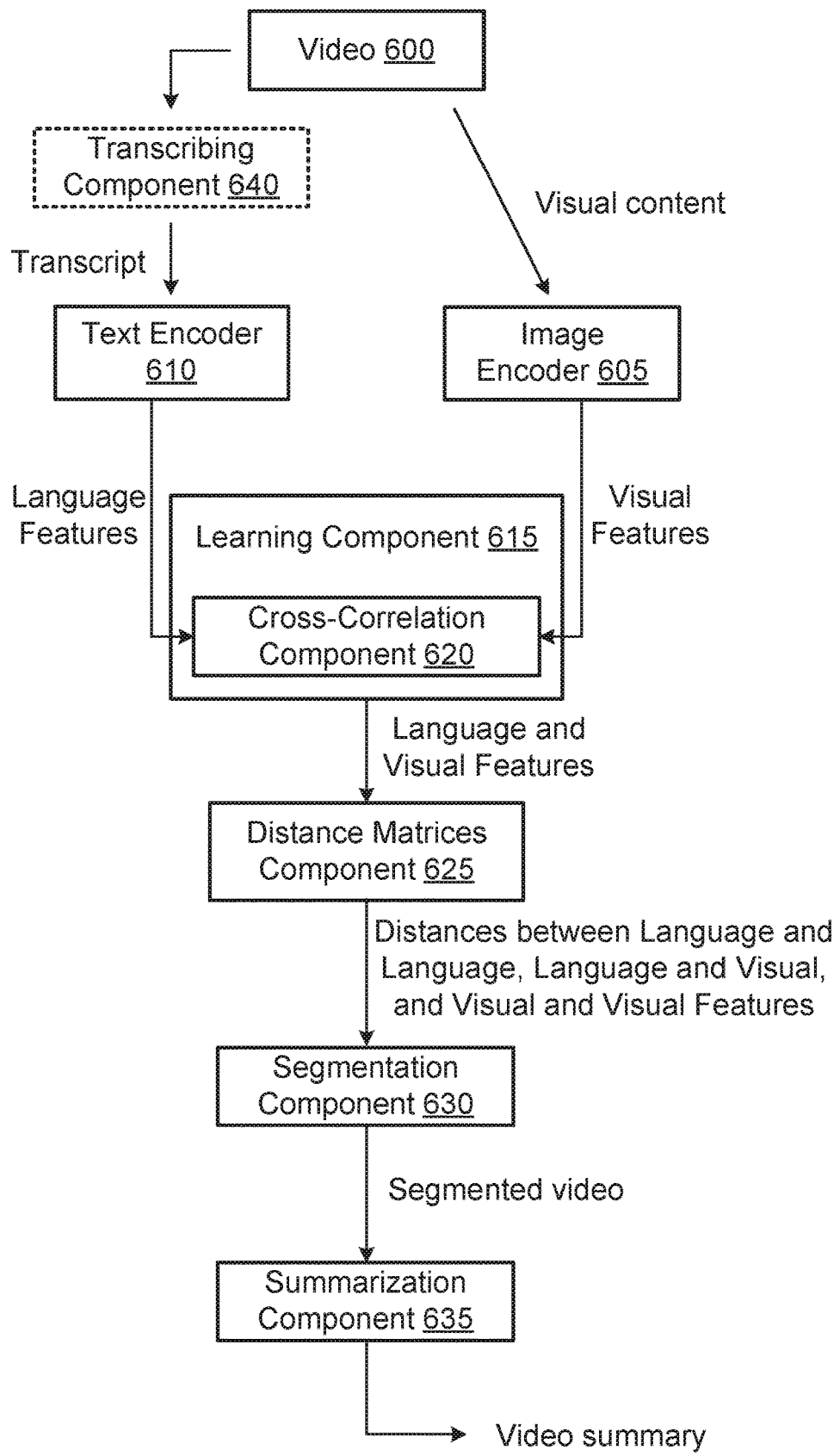
FIG. 6 shows an example of a video summarization diagram according to aspects of the present disclosure.

FIG. 6 shows an example of a video 600 summarization diagram according to aspects of the present disclosure. The example shown includes video 600, image encoder 605, text encoder 610, learning component 615, distance matrices component 625, segmentation component 630, summarization component 635, and transcribing component 640.

Image encoder 605 is an example of, or includes aspects of, the corresponding element described with reference to FIGS. 2 and 3. Text encoder 610 is an example of, or includes aspects of, the corresponding element described with reference to FIGS. 2 and 3. Learning component 615 is an example of, or includes aspects of, the corresponding element described with reference to FIG. 2.

Distance matrices component 625 is an example of, or includes aspects of, the corresponding element described with reference to FIG. 3. Segmentation component 630 is an example of, or includes aspects of, the corresponding element described with reference to FIGS. 2 and 3. Summarization component 635 is an example of, or includes aspects of, the corresponding element described with reference to FIG. 2.

According to some aspects, a video 600 is provided to the video summarization system by, for example, a user or a database. In some embodiments, transcribing component 640 converts audio data associated with the video 600 to obtain a transcript of the video.

Then, the transcript is provided to text encoder 610 to generate and encode language features, and the visual content of the video is provided to image encoder 605 to generate and encode visual features. In some embodiments, these generated features include intermediate language and visual features.

The encoders provide the intermediate language and visual features to cross-correlation component 620. In one aspect, learning component 615 includes cross-correlation component 620. Cross-correlation component 620 is an example of, or includes aspects of, the corresponding element described with reference to FIGS. 2 and 3.

Cross-correlation component 620 may perform cross-correlation analysis to capture relationships across the visual and language modalities. In some embodiments, cross-correlation component 620 generates "high-level" features from the intermediate features. In some embodiments, the high-level features include latent information relationships among the unimodal features and across the multimodal features. The features and captured relationships are then sent to distance matrices component 625.

Distance matrices component 625 calculates one or more distances between the features. In some embodiments, the distances between the features include distances (e.g., Wasserstein Distances) between language features and other language features, distances between visual features and other visual features, and distances (e.g., Gromov Wasserstein Distances) between language features and visual features. In some embodiments, the distances include distances determined by cross-correlation analysis or by CCA.

The distances are provided to segmentation component 630, which uses the information including the relationships between the language and visual features to determine how to temporally segment the original input video. The segmented video is provided to summarization component 635, which generates a video summary. In some embodiments, the video summary includes representative video frames, portions of the video, or sentences from the transcript, or a combination thereof.

In some embodiments, after the visual and language features are encoded and the distances are calculated, segmentation component 630 separates the video using Hierarchical Cluster Analysis (HCA). HCA is an algorithmic approach to find discrete groups with varying degrees of similarity represented by a similarity matrix. These groups are hierarchically organized as the algorithm proceeds and can be presented as a dendrogram. Embodiments which utilize HCA also use the same visual and language feature extraction method, then group the features by HCA to generate video segments with a distance metric and produce a dendrogram as an intermediate result.

In one embodiment using HCA, the total distance is given by: $d=\alpha_b d_t+(1-\alpha_b)d_f$, which includes two parts, where $d_t$ is the distance based on timestamps, and $d_f$ is the distance based on feature content, and $\alpha_b$ is used to balance the feature distance and time distance. Feature points representing content get separated further apart when the time distance of the corresponding features is large. Another parameter $\beta_b$ is used to control the number of generated segments, where $\beta_b$ is compared with the similarity score to cut through the dendrogram tree at a certain height (e.g., $\beta_b$=sim=0.5) to create clusters of images with that level of similarity.

Figure 7:
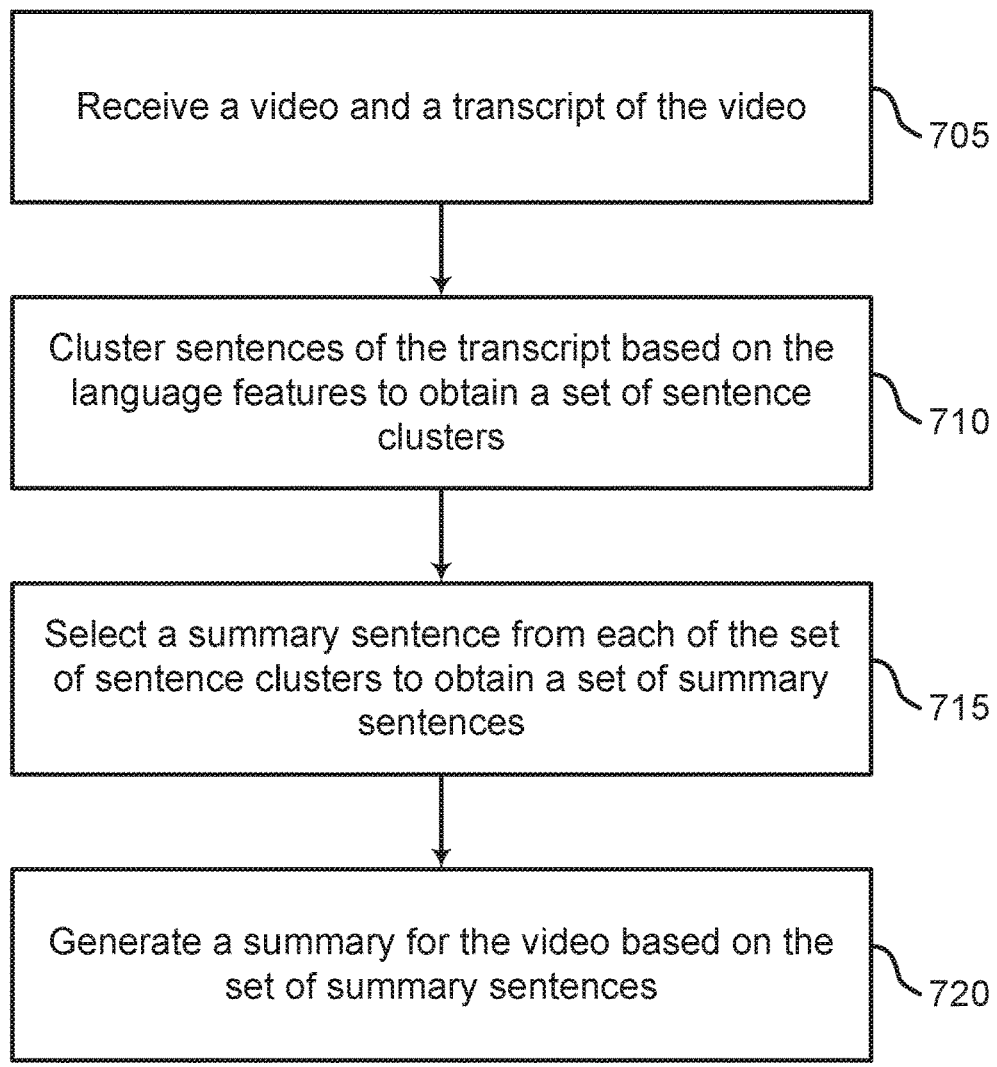
FIG. 7 shows an example of a method for generating a summary according to aspects of the present disclosure.

FIG. 7 shows an example of a method 700 for generating a summary according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Language summarization aims to produce a concise and fluent summary while preserving key information and overall meaning. Two types of language summarization methods include abstractive summarization and extractive summarization. Abstractive methods select words based on semantic understanding, even though the words might not appear in the source. Extractive methods attempt to summarize language by selecting a subset of words that retain the most important points, which weights the important part of sentences to form the summary. Training based abstractive summarization requires huge amount of labeled data to train models in a supervised learning manner, so at least some embodiments adopt data-driven extractive summarization approach to generate text summaries of each video segment.

Embodiments use a transformer network to generate text embeddings and K-Means clustering to identify sentences closest to a centroid of the cluster for summary selection. Some transformer network architectures have objectives that are specific for pre-training. For example, some randomly mask out 10% to 15% of the words in the training data, attempting to predict the masked words, and take in an input sentence and a candidate sentence. Then, the network predicts whether the candidate sentence properly follows the input one. Multiple layers can be used to extract embeddings, where the "cls" layer of the transformer network produces the necessary N×E matrix for clustering, where N is the number of sentences and E is the embeddings dimension. The outputs for other layers in the network produced N×W×E embeddings, where W is equal to the tokenized words. Embodiments of the transformer network use the second to last layer averaged embeddings as representations of words.

Visual summarization aims to extract visual key frames from each segment. The key frames are the representative frames of a video stream, which provides the most accurate and compact summary of the video content. To fit the characteristic of the livestream videos, embodiments solve the visual summarization task in an unsupervised manner, and use K-Means clustering to cluster frames using image histogram and then select the best frame from clusters based on variance of Laplacian, which is based on image blur detection.

Referring again to FIG. 7, at operation 705, the system receives a video and a transcript of the video. In some cases, the operations of this step refer to, or may be performed by, a video summarization apparatus as described with reference to FIGS. 1 and 2.

At operation 710, the system clusters sentences of the transcript based on the language features to obtain a set of sentence clusters. In some cases, the operations of this step refer to, or may be performed by, a summarization component as described with reference to FIGS. 2 and 6. At operation 715, the system selects a summary sentence from each of the set of sentence clusters to obtain a set of summary sentences. In some cases, the operations of this step refer to, or may be performed by, a summarization component as described with reference to FIGS. 2 and 6.

At operation 720, the system generates a summary for the video based on the set of summary sentences. In some cases, the operations of this step refer to, or may be performed by, a summarization component as described with reference to FIGS. 2 and 6. In some cases, the clustering is generated according to the K-means clustering described above. In some cases, the clustering is based on the HDP-HSMM techniques, to be further described below.

Figure 8:
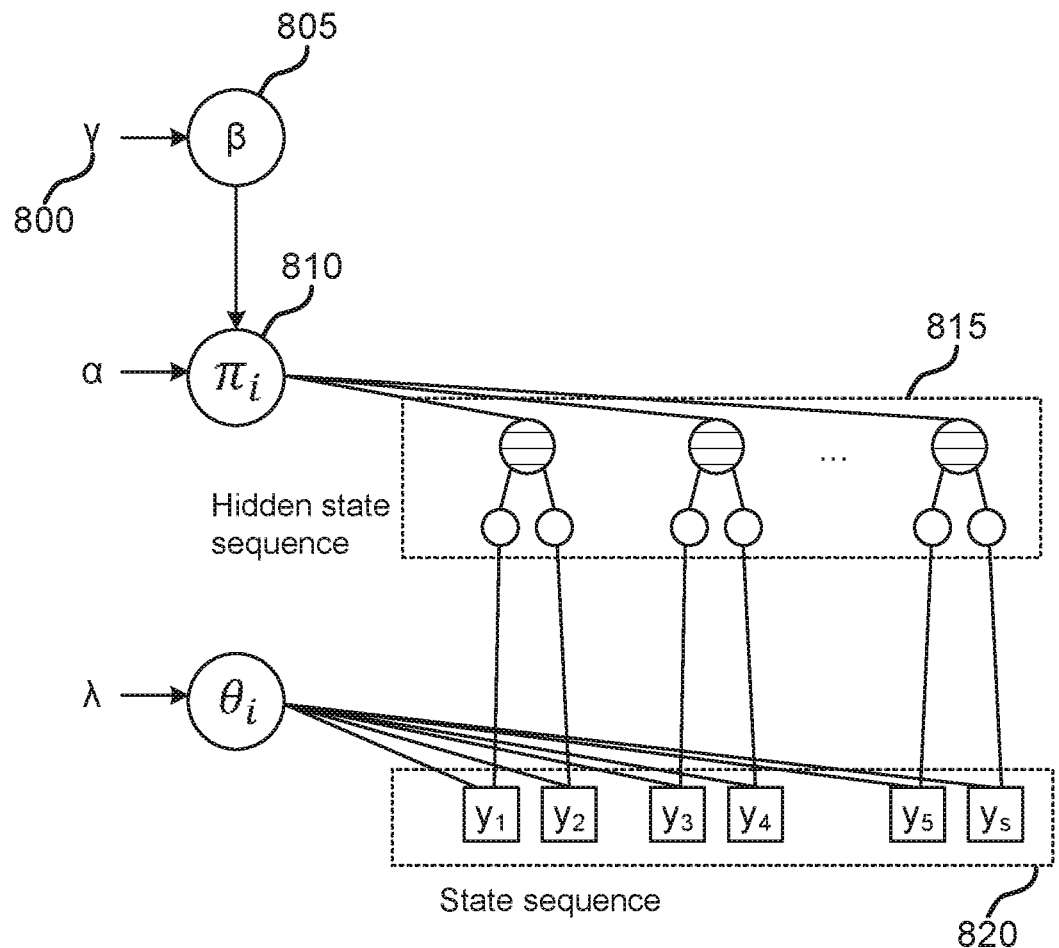
FIG. 8 shows an example of a Hierarchical Dirichlet Process Hidden semi-Markov Model according to aspects of the present disclosure.

FIG. 8 shows an example of a Hierarchical Dirichlet Process Hidden semi-Markov Model (HDP-HSMM) according to aspects of the present disclosure. The example shown includes concentration parameter 800, weight coefficient 805, distribution parameter 810, hidden state sequence 815, and state sequence 820.

HDP-HSMM is used in some embodiments to cluster the visual features in order to generate video segments. In longer videos, visual features corresponding to different segments of video can mix together (i.e., overlap each other geometrically). This noisy visual feature information can cause some clustering methods to cluster features that are from different topics, resulting in incorrect segmentation. HDP-HSMM provides clustering for such noisy visual feature information.

A Hidden Markov Model (HMM) is a statistical model which follows the Markov process to identify the hidden states from a set of observations, which has been widely used in sequential data problems. A drawback of the unaltered HMM is that state duration distributions are restricted to a geometric form and the number of hidden states must be set a priori. A Hidden Semi-Markov Model (HSMM) overcomes these drawbacks, where there is a distribution placed over the duration of every state, tweaking the idea into a semi-Markov one. However, the number of hidden states in HMM and HSMM is unknown beforehand, and their patterns are subject to a specific distribution defined over a measure space. HMM with Hierarchical Dirichlet Process (HDP) extension can be used for inferring arbitrarily large state complexity from sequential and timeseries data. However, the HDP-HMM's strict Markovian constraints are undesirable in many settings. To overcome the issues, an explicit-duration Hierarchical Dirichlet Process Hidden semi-Markov Model (HDP-HSMM) provides new methods for sampling inference in the finite Bayesian HSMM.

In HMM, state transition probability from state i to j can be defined as $\pi_{i,j}=p(x_{t+1}=j|x_t=i)$, then the transition matrix can be denoted as $\pi=\{\pi_{i,j}\}^{|x|}_{i,j=1}$, where $|x|$ denotes the number of hidden states. The distribution of observations $y_t$ (e.g., observed states, e.g., state sequence 820) given specific hidden states is denoted by $p(y_t|x_t, \theta_i)$, where $\theta_i$ denotes the emission parameter of state i. Then the HSMM can be described as:

$$x_s|x_{s-1} \sim \pi_{x_{s-1}}, d_s \sim g(w_s), y_t|x_s, d_s \sim F(\theta_{x_s}, d_s) \quad (3)$$

where $F(\cdot)$ is an index family of distributions, the probability mass function of $d_s$ is $p(d_s|x_t=i)$, $g(w_s)$ denotes a state-specific distribution over the duration $d_s$, and $w_s$ denotes the parameter priori of the duration distributions.

The Dirichlet Process (DP) is a stochastic process applied in nonparametric Bayesian models, which can be regarded as the distribution of the discrete distribution of infinite categories. HDP is a multilayer extension of DP, including at least two layers of DP with a complex state inference and Bayesian mixing. Let $\Theta$ be a measurable space with a probability measure H on the space, $\gamma$ is a positive real number called the concentration parameter (e.g., concentration parameter 800). $DP(\gamma, H)$ is defined as the distribution of the random probability measure of G over $\Theta$. For any finite measurable partition of $\Theta$, the vector is distributed as a finite-dimensional Dirichlet distribution:

$$G_0 \sim DP(\gamma, H), G_0 = \sum_{k=1}^{K} \beta_k \delta_{\theta_k}, \theta_k \sim H, \beta \sim GEM(\gamma) \quad (4)$$

where $\theta_k$ is the distribution of H, $\beta \sim GEM(\gamma)$ represents the stick-breaking construction process of the weight coefficient, and $\delta_\theta$ is the Dirac function.

FIG. 8 illustrates the process of HDP-HSMM, which can also be written as the following series of equations:

$$\beta \sim GEM(\gamma) \quad (5)$$

$$\pi_i | \alpha, \beta \sim DP(\alpha, \beta), i = 1, 2, \ldots, \infty \quad (6)$$

$$\theta_i \sim H(\lambda), i = 1, 2, \ldots, \infty \quad (7)$$

$$z_s \sim \bar{\pi}_{z_{s-1}}, s = 1, 2, \ldots, S \quad (8)$$

$$D_s \sim g(w_{z_s}), s = 1, 2, \ldots, S \quad (9)$$

$$w_i \sim \Omega, x_{t_s^1:t_s^1 D_s+1} = z_s, y_{t_s^1:t_s^1 D_s+1} \sim F(\theta_{x_t}) \quad (10)$$

where $\pi_i$ is the distribution parameter of hidden sequence $z_s$ (e.g., hidden state sequence 815), implying that HDP provides an infinite number of states for HSMM, $D_s$ is the length distribution of the state sequence with distribution parameter w, and $y_{t_s}$ is the observation sequence with distribution parameter $\theta_t$.

In Bayesian nonparametric models, the Gibbs sampling algorithm is widely used for inference of model parameters. In the HDP-HSMM model, a weak-limit Gibbs sampling algorithm is applied. The weak limit approximation transforms the infinite dimension hidden state into finite dimension form, so the hidden state chain can be updated according to the observation data. It is assumed that the basic distribution $H(\cdot)$ and the observation series distribution $F(\cdot)$ are conjugated distributions, the hidden states distribution $g(\cdot)$ is a Poisson distribution, and the hidden states distribution and the observation series distribution are independent. Embodiments sample the weight coefficient (e.g., weight coefficient 805) and the state sequence distribution parameter $\pi_i$ (e.g., distribution parameter 810:

$$\beta \mid \gamma \sim Dir\left(\frac{\gamma}{S}, \ldots, \frac{\gamma}{S}\right) \tag{11}$$

$$\pi_i \mid \alpha, \beta \sim Dir(\alpha\beta_1, \ldots, \alpha\beta_s) j = 1, \ldots S \tag{12}$$

Then embodiments sample the observation distribution parameters $\theta_i$ and the state duration distribution parameter $w_i$ according to observation data. It is assumed that the observed data obey a multivariate Gaussian distribution, the model parameters $\theta_i = (u_i, \Sigma_i)$ obey the Normal-Inverse-Wishart distribution:

$$NIW(u, \Sigma \mid v_0, \Delta_0, \mu_0, S_0) \triangleq N(\mu \mid \mu_0, S_0) * IW(\Sigma \mid v_0, \Delta_0 \tag{13}$$

where $\varphi = \{u_0, S_0, v_0, \Delta_0\}$ are prior parameters, $\mu_0$ and $S_0$ are the prior mean and co-variance matrices, and $v_0$ and $\Delta_0$ are the degrees of freedom and scale of NIW distribution. The state duration distribution is a Poisson distribution, and parameter $w_i$ follows a Beta distribution: $w \sim Beta(\eta_0, \sigma_0)$. Then parameters are updated according to the observation data.

Training

Figure 9:
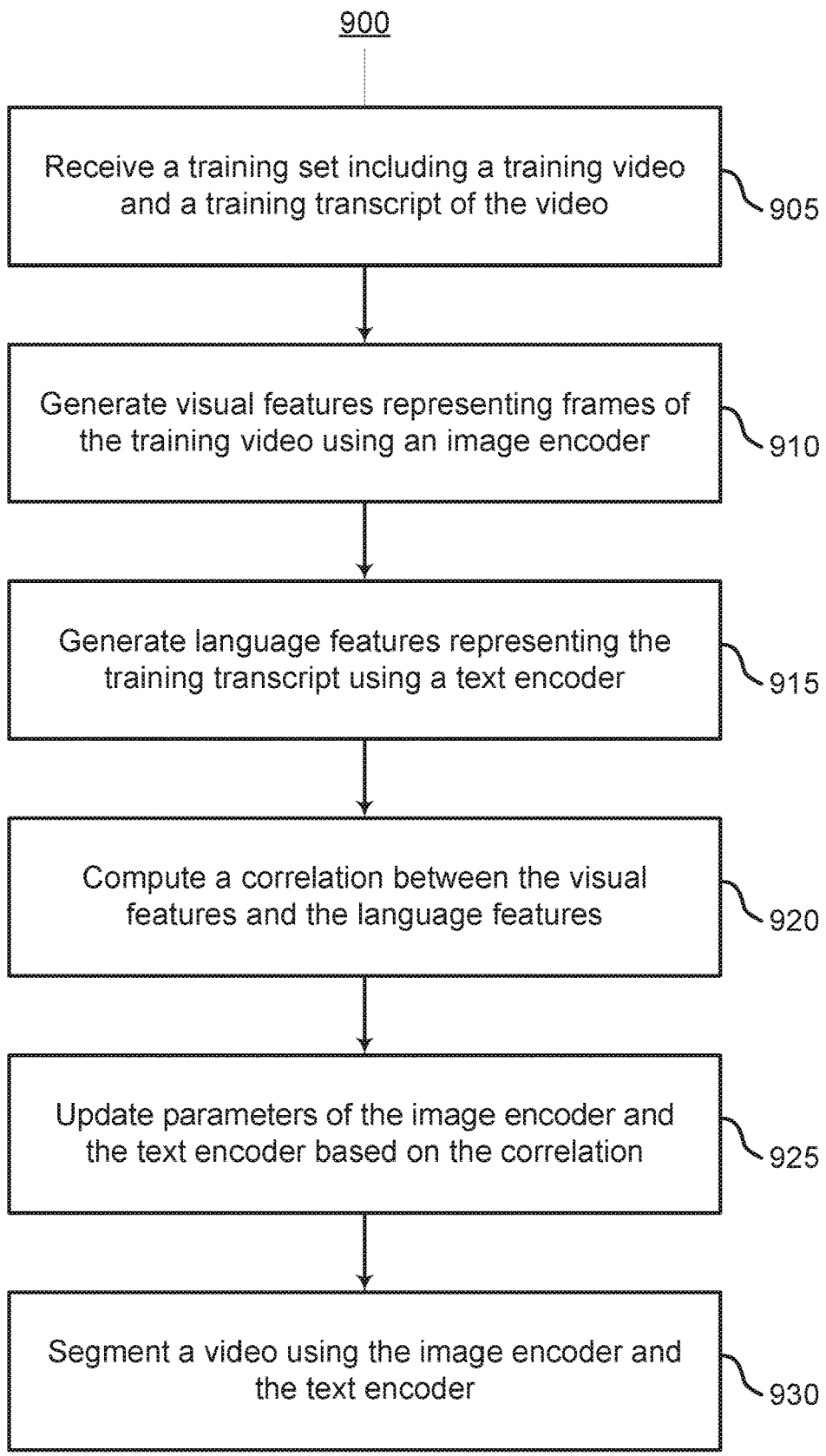
FIG. 9 shows an example of a method for training a neural network according to aspects of the present disclosure.

FIG. 9 describes a method for multimodal unsupervised video temporal segmentation. One or more aspects of the method include receiving a training set comprising a training video and a training transcript of the video; generating visual features representing frames of the training video using an image encoder; generating language features representing the training transcript using a text encoder; computing a correlation between the visual features and the language features; updating parameters of the image encoder and the text encoder based on the correlation; and segmenting a video using the image encoder and the text encoder.

Some examples of the method, apparatus, non-transitory computer readable medium, and system further include performing a convolution process on frames of the video to obtain intermediate visual features. Some examples further include transforming the intermediate visual features using a visual correlation transformation to obtain the visual features.

Some examples of the method, apparatus, non-transitory computer readable medium, and system further include encoding the transcript using a language model to obtain intermediate language features. Some examples further include transforming the intermediate language features using a language correlation transformation to obtain the language features.

FIG. 9 shows an example of a method 900 for video segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The following will describe how the encoders, feature transformers, and cross-correlation components are optimized using machine learning in accordance with the teachings of the present disclosure.

Given the relationship and dependency between visual and language features, embodiments utilize a Deep Canonical Correlation Analysis (DCCA) to encode the dependency for a hierarchical feature transformation. In some embodiments, operations relating to DCCA, including modeling relationships between language features and visual features, are performed by cross-correlation component as described with reference to FIG. 2. Canonical Correlation Analysis (CCA) is a method for exploring the relationships between two multivariate sets of variables, which can learn linear transformation of two vectors in order to maximize the correlation between them.

Embodiments use CCA to capture the relationship between modalities. For visual features $V_2$ and language features $L_2$, $(V_2, L_2) \in \mathbb{R}^{n_1} \times \mathbb{R}^{n_2}$ has covariances $(\Sigma_{11}, \Sigma_{22})$ and cross-covariance $\Sigma_{12}$. CCA finds pairs of linear projections of the two views, $(w'_1 V_2, w'_2 L_2)$ that are maximally correlated:

$$(w_1^*, w_2^*) = \tag{14}$$
$$\text{argmax}_{w1, w2} corr(w'_1 V_2, w'_2 L_2) = \text{argmax}_{w1, w2} \frac{w'_1 \Sigma_{12} w_2}{\sqrt{w'_1 \Sigma_{11} w_1 w'_2 \Sigma_{22} w_2}}$$

Since the objective is invariant to scaling of $w_1$ and $w_2$, the projections are constrained to have unit variance:

$$(w_1^*, w_2^*) = \text{argmax}_{w'_1 \Sigma_{11} w_1} = \text{argmax}_{w'_2 \Sigma_{22} w_2} = \text{argmax}_{w'_1 \Sigma_{12} w_2} \tag{15}$$

Deep CCA (DCCA) is applied in the framework for non-linear feature transformation. Assigning $\theta_1$ and $\theta_2$ to represent the parameters for visual feature transformer 315 $f(V_1)$ and language feature transformer 355 $g(L_1)$, respectively, then the transformation aims to satisfy the following:

$$(\theta^*_1, \theta^*_2) = \text{argmax}_{(\theta_1, \theta_2)} corr(f(V_1; \theta_1), g(L_1; \theta_2)) \tag{16}$$

The parameters are trained (e.g., using learning component described with reference to FIG. 2) so as to optimize the quantity of Equation (16) by using gradient-based optimization, by taking the correlation as the negative loss with backpropagation to update the nonlinear transformation model including each feature transformer.

Once the high-level features, e.g. visual features 325 and language features 360, are produced from the trained visual feature transformer 315, language feature transformer 355, and cross-correlation component 320, they are compared across domains using distance metrics. The distance matrices produced from WD, GWD, and CCA are then provided to segmentation component (e.g., segmentation component 255 of FIG. 2).

Referring again to FIG. 9, at operation 905, the system receives a training set including a training video and a training transcript of the video. In some cases, the operations of this step refer to, or may be performed by, a learning component as described with reference to FIG. 2.

At operation 910, the system generates visual features representing frames of the training video using an image encoder. In some cases, the operations of this step refer to, or may be performed by, an image encoder as described with reference to FIG. 3. In some embodiments, operation 910 further includes generating intermediate visual features, which are then transformed into the visual features, e.g., by using language correlation transformation component 245 of FIG. 2.

At operation 915, the system generates language features representing the training transcript using a text encoder. In some cases, the operations of this step refer to, or may be performed by, a text encoder as described with reference to FIGS. 2, 3, and 6. In some embodiments, operation 915 further includes generating intermediate language features, which are then transformed into the language features, e.g., by using visual correlation transformation component 230 of FIG. 2.

At operation 920, the system computes a correlation between the visual features and the language features. In some cases, the operations of this step refer to, or may be performed by, a learning component as described with reference to FIGS. 2 and 6. In some cases, the operations of this step refer to, or may be performed by, a cross-correlation component as described with reference to FIGS. 2 and 6. In some cases, the cross-correlation component is a part of the learning component.

At operation 925, the system updates parameters of the image encoder and the text encoder based on the correlation. In some embodiments, the correlation-optimized parameters allow the system to capture the relationships across modalities using Cross Correlation Analysis as described above. In some cases, the operations of this step refer to, or may be performed by, a learning component as described with reference to FIGS. 2 and 6.

At operation 930, the system segments a video using the image encoder and the text encoder. In some cases, the operations of this step refer to, or may be performed by, a segmentation component as described with reference to FIGS. 2, 3, and 6. Some embodiments of segmentation component utilize Bayesian Nonparametric models to segment the videos temporally.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
receiving a video and a transcript of the video;
generating initial visual features representing frames of the video using an image encoder by performing a convolution process on the frames of the video;
generating initial language features representing the transcript using a text encoder;
performing a first non-linear transformation on the initial language features based on a cross-correlation between the initial language features and the initial visual features using a language feature transformer to obtain correlated language features;
performing a second non-linear transformation on the initial visual features based on a cross-correlation between the initial visual features and the initial language features using a visual feature transformer different from the language feature transformer to obtain correlated visual features; and
segmenting the video into a plurality of video segments based on the correlated visual features and the correlated language features.

2. The method of claim 1, further comprising:
converting audio data associated with the video to obtain the transcript.

3. The method of claim 1, further comprising:
dividing the transcript into a plurality of sentences, wherein the language model is individually applied to each of the plurality of sentences.

4. The method of claim 1, further comprising:
computing one or more distances between the correlated visual features and the correlated language features, wherein the video is segmented based on the one or more distances.

5. The method of claim 4, wherein:
the one or more distances comprises a Wasserstein Distance and a Gromov Wasserstein Distance.

6. The method of claim 1, further comprising:
computing a canonical correlation between the visual features and the language features, wherein the video is segmented based on the canonical correlation.

7. The method of claim 1, further comprising:
clustering the visual features to obtain a plurality of visual feature clusters, wherein the video is segmented based on the plurality of visual feature clusters.

8. The method of claim 7, wherein:
the clustering is based on a Hierarchical Dirichlet Process Hidden semi-Markov Model (HDP-HSMM).

9. The method of claim 7, further comprising:
selecting a representative video frame for each of the plurality of visual feature clusters.

10. The method of claim 1, further comprising:
clustering sentences of the transcript based on the language features to obtain a plurality of sentence clusters;
selecting a summary sentence from each of the plurality of sentence clusters to obtain a plurality of summary sentences; and generating a summary for the video based on the plurality of summary sentences.

11. The method of claim 10, further comprising:
aligning the plurality of summary sentences with the plurality of video segments, wherein the summary is based on the alignment.

12. A method comprising:
receiving a training set comprising a training video and a training transcript of the video;
generating visual features representing frames of the training video using an image encoder by performing a convolution process on the frames of the video;
generating language features representing the training transcript using a text encoder;
performing, using a language feature transformer of the text encoder, a first non-linear transformation on the language features based on a cross-correlation between the language features and the visual features to obtain correlated language features;
performing, using a visual feature transformer of the image encoder different from the language feature transformer, a second non-linear transformation on the visual features based on a cross-correlation between the visual features and the language features to obtain correlated visual features;
updating parameters of the image encoder and the text encoder based on the correlated language features and the correlated visual features; and
segmenting a video using the image encoder and the text encoder.

13. The method of claim 12, wherein generating the correlated visual features comprises:
performing the convolution process on frames of the video to obtain intermediate visual features; and
transforming the intermediate visual features using a visual correlation transformation to obtain the correlated visual features.

14. The method of claim 12, further comprising:
encoding the transcript using a language model to obtain intermediate language features; and
transforming the intermediate language features using a language correlation transformation to obtain the correlated language features.

15. An apparatus comprising:
an image encoder configured to generate visual features representing frames of a video by performing a convolution process on the frames of the video;
a text encoder configured to generate language features representing a transcript of the video, wherein the image encoder and the text encoder are trained to update the language features and the visual features using a first non-linear transformation and a second non-linear transformation different from the first non-linear transformation, respectively, based on a correlation between training visual features and training language features, to obtain correlated language features and correlated visual features; and
a segmentation component configured to segment the video into a plurality of video segments based on the correlated visual features and the correlated language features.

16. The apparatus of claim 15, further comprising:
a text summarization component configured to generate a summary for the video based on the language features.

17. The apparatus of claim 15, wherein:
the image encoder comprises a convolutional neural network and a visual correlation transformation component.

18. The apparatus of claim 15, wherein:
the text encoder comprises a transformer network and a language correlation transformation component.

* * * * *